(12) United States Patent
Li

(10) Patent No.: US 9,959,680 B2
(45) Date of Patent: May 1, 2018

(54) REAL-TIME TRAVEL EXPERIENCE SYSTEM BASED ON VIRTUAL REALITY TECHNOLOGY

(71) Applicant: Yuanling Zhang, Shenzhen, Guangdong Province (CN)

(72) Inventor: Yanji Li, Hong Kong (CN)

(73) Assignee: Yuanling Zhang, Shenzhen, Guangdong Province (CN)

( * ) Notice: Subject to any disclaimer, the term of this patent is extended or adjusted under 35 U.S.C. 154(b) by 25 days.

(21) Appl. No.: 15/242,849

(22) Filed: Aug. 22, 2016

(65) Prior Publication Data

US 2018/0040165 A1 Feb. 8, 2018

(30) Foreign Application Priority Data

Aug. 4, 2016 (CN) .......................... 2016 1 0632741

(51) Int. Cl.
| | |
|---|---|
| *G09B 9/00* | (2006.01) |
| *G06T 19/00* | (2011.01) |
| *H04N 9/31* | (2006.01) |
| *G06F 3/16* | (2006.01) |
| *H04N 5/247* | (2006.01) |
| *G06F 3/01* | (2006.01) |
| *H04L 29/08* | (2006.01) |

(52) U.S. Cl.
CPC ............ *G06T 19/006* (2013.01); *G06F 3/011* (2013.01); *G06F 3/16* (2013.01); *H04N 5/247* (2013.01); *H04N 9/3147* (2013.01); *H04L 67/12* (2013.01)

(58) Field of Classification Search
CPC .......... G06T 19/006; G06F 3/011; G06F 3/16; H04N 5/247; H04N 9/3147; H04L 67/12
USPC .......................................................... 348/121
See application file for complete search history.

(56) References Cited

U.S. PATENT DOCUMENTS

| | | | | |
|---|---|---|---|---|
| 2002/0182569 | A1* | 12/2002 | Raha ..................... | G09B 9/203 434/69 |
| 2008/0027590 | A1* | 1/2008 | Phillips ................ | G05D 1/0088 701/2 |
| 2012/0287284 | A1* | 11/2012 | Jacobsen ................. | G06F 1/163 348/158 |

* cited by examiner

*Primary Examiner* — Christopher S Kelley
*Assistant Examiner* — Matthew Kwan
(74) *Attorney, Agent, or Firm* — Collard & Roe, P.C.

(57) ABSTRACT

A real-time travel experience system based on virtual reality technology includes sight real-time acquisition subsystems, a network transmission subsystem, a center platform subsystem and experience site subsystems. Based on virtual reality technology, the system collects the scenery and environment parameters of scenic spots using an unmanned aerial vehicle, transmits the data to an experience site, and simulates a sight real-time state vis the experience site by using the data received, providing more real user experiences; meanwhile, the user can view in motion via a walking caterpillar and a rotary base, a scenery environment can also be moved or steered due to the motion or steering of the user, so that the user experience is significantly enhanced. The system can be widely applied in various virtual travel systems.

6 Claims, 1 Drawing Sheet

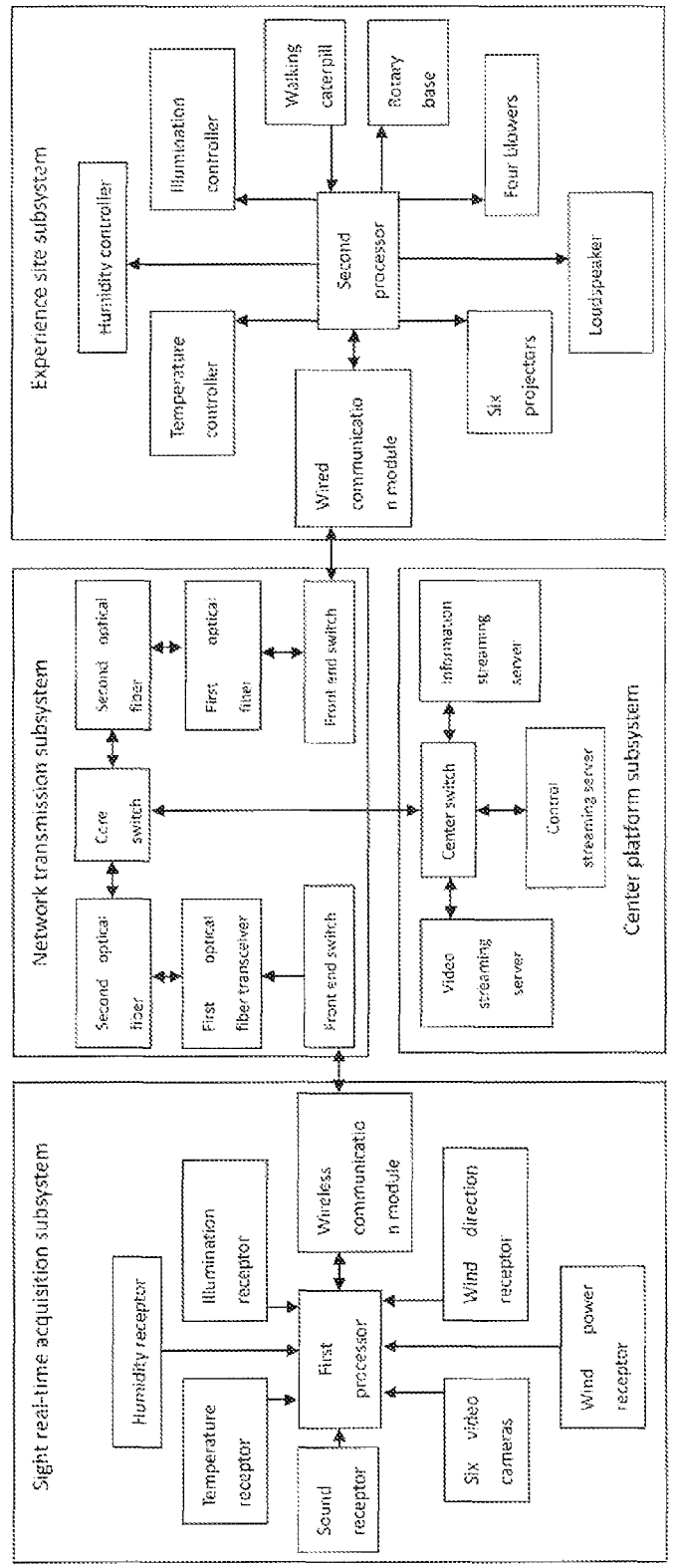

REAL-TIME TRAVEL EXPERIENCE SYSTEM BASED ON VIRTUAL REALITY TECHNOLOGY

CROSS REFERENCE TO RELATED APPLICATIONS

Applicant claims priority under 35 U.3.C. § 119 of Chinese Application No. 201610 632741.0 filed Aug. 4, 2016, the disclosure of which is incorporated by reference.

TECHNICAL FIELD

The present invention relates to a travel experience system, and more particularly, to a real-time virtual travel experience system method.

BACKGROUND

Virtual reality technology is a computer simulation system capable of creating and experiencing a virtual world, generating a simulation environment by means of a computer, it is a systematic simulation of multi-source information fusion interactive three-dimensional dynamic view and entity behavior, making a user to immerse himself into the environment.

China, with large population, is building a moderately prosperous society in all aspects. An increase in national income and a rise in living standard lay an abundant material foundation for the development of travel industry. Travel becomes an important option for business, leisure and recreation of people. However, due to an accelerated pace of urban life and busy working hour, the limitation to travel hour becomes a bottleneck of tourism development. Particularly, with respect to long-distant travel, people need to spend a lot of time on the road, and travel fatigue has a serious impact on the travel experience and quality, so that virtual travel-is emerged at the right moment.

The virtual travel means that it is established on the basis of a real tourism landscape., a virtual three-dimensional travel environment is created through simulation or surreal scene using the virtual reality technology; in this way, a net friend, staving at home, can also broaden, his view of realistic, vivid and meticulous sceneries outside ten thousand miles in the three-dimensional virtual environment. The virtual travel is one of application scope of vrp-travel virtual travel platform technology. The three-dimensional simulation of scene is applied by a computer technology, and an operator experiences the destination scene in virtual of a certain technological means.

In the prior art, the virtual travel technology has the following problems:

1. The scenic spots is simulated by the stored video or picture-resources. The prior art is merely limited to achieve the simulation of the stored scene, and fails to enable the user to experience the real scenery of the scenic spots at this time, so that the limited scene resources are easy to he boring.

2. The prior art fails to simulate weather and local environment. For instance, such environment factors as temperature, humidity, illumination and the like are unable to be experienced by the user.

3. The prior art fails to interact with the user or the interactive effect experience is poor. In the prior art, the user can only view the landscape of scenic spots, or change the landscape through equipment operation of a mouse remote control unit, greatly differing from the reality experience, and thus the interactive effect and the reality of the travel experience are poor.

SUMMARY OF THE INVENTION

In order to solve the above-mentioned technical problems, the present invention aims at providing a travel experience system capable of simulating local environment and weather of scenic spots as well s having a good user interactive experience.

The present invention employs the following technical solutions.

a real-time travel experience system based on virtual reality technology according to the invention comprises a plurality of sight real-time acquisition subsystems, a network transmission subsystem, a center platform subsystem and a plurality of experience site subsystems. The plurality of sight real-time acquisition subsystems and the plurality of experience site subsystems are connected with the network transmission subsystem, and the network transmission subsystem is connected with the center platform subsystem.

The sight real-time acquisition subsystem comprises at least an unmanned aerial vehicle, wherein the unmanned aerial vehicle is provided with a video camera in front, rear, upper, lower, left, and right directions respectively. The unmanned aerial vehicle further comprises a temperature receptor, a humidity receptor, an illumination receptor, a wind direction receptor, a wind power receptor, a sound collector, a wireless communication module and a first processor. The output ends of the temperature receptor, the humidity receptor, the illumination receptor, the wind direction receptor, the wind power receptor, the sound collector are all connected with the input end of the first processor connected with the wireless communication module.

The experience site subsystem comprises a cuboid room, a wearable intelligent device. The room are provided with six projectors arranged in the middle thereof for projecting onto front, rear, upper, lower, left and right wall surfaces thereof, a blower arranged at all four sides thereof respectively. The room is further provided with a temperature controller, a humidity controller, an illumination controller, a loudspeaker, a wire communication module and a second processor. The room is further provided with a walking caterpillar arranged on a rotary base on a bottom surface thereof. The wearable intelligent device is provided with a gyroscope, the wire communication module is connected with the second processor, an output end of the second processor is connected with the input ends of the six projectors, four blowers, temperature controller, humidity controller, illumination controller, loudspeaker and rotary base respectively for controlling the experience site subsystem to create a corresponding environment when the second processor receives the environment, data collected by the sight real-time acquisition subsystem. The output ends of both the gyroscope and the walking caterpillar are connected with the second processor for controlling the unmanned aerial vehicle in the sight real-time acquisition subsystem to steer and move as well as controlling the rotary base to rotate correspondingly when the gyroscope in the experience site subsystem experiences a change in direction and distance.

The center platform subsystem comprises a video streaming server for processing video data, a control streaming server for processing control data, an information streaming server for user processing information transmission, a database server for storing data and a center switch, wherein the center switch is connected with the video streaming server, the control streaming server, the information streaming server and the database server respectively.

The network transmission subsystem comprises a front end switch, a first fiber optical transceiver, a second fiber optical transceiver and a core switch, wherein the front end switch is used for connecting the wireless communication module in the sight real-time acquisition subsystem or the wire communication module in the experience site subsystem, the front end switch is connected with the first fiber optical transceiver, the first fiber optical transceiver is connected with the second fiber optical transceiver, the second fiber optical transceiver is connected with the core switch, and the core switch is connected with the center switch.

Preferably, the sound collector is a microphone.

Preferably, the wireless communication module is a 3G mobile communication module, 4G mobile communication module or a WIFI wireless communication module.

Preferably, the wearable intelligent device is an intelligent helmet.

The present invention has the advantageous effects that: the present invention is based on virtual reality technology, collects scenery and environment parameters of scenic spots using an unmanned aerial vehicle, transmits to an experience site, and simulates a sight real-time state via the experience site, so that a user experience is more real; in the meanwhile, the user can view in motion via a walking caterpillar and a rotary base, a scenery environment can also be moved or steered due to the motion or steering of the user, so that the user experience is significantly enhanced.

The invention can be widely applied in various virtual travel systems.

BRIEF DESCRIPTION OF THE DRAWINGS

The embodiments of the present invention are further described hereunder with reference to the drawings:

The sole FIGURE is a network structure diagram of a system according to an embodiment of the present invention.

DETAILED DESCRIPTION OF PREFERRED EMBODIMENTS

It should be noted that, the embodiments in the specification and the features in the embodiment can be mutually combined under the condition without conflict.

As shown in the sole FIGURE, the real-time travel experience system based on virtual reality technology comprises a plurality of sight real-time acquisition subsystems, a network transmission subsystem, a center platform subsystem and a plurality of experience site subsystems, wherein the plurality of sight real-time acquisition subsystems and the plurality of experience site subsystems are connected with the network transmission subsystem, and the network transmission subsystem is connected with the center platform subsystem. The plurality of sight real-time acquisition subsystems are arranged in a plurality of scenic spots respectively, and the experience site subsystems are arranged in a plurality experience sites respectively.

The sight real-time acquisition subsystem comprises at least an unmanned aerial vehicle, wherein the unmanned aerial vehicle is provided with a video camera in front, rear, upper, lower, left and right directions respectively, the unmanned aerial vehicle further comprises a temperature receptor, a humidity receptor, an illumination receptor, a wind direction receptor, a wind power receptor, a sound collector, a wireless communication module and a first processor. The output ends of the temperature receptor, the humidity receptor, the illumination receptor, the wind direction receptor, the wind power receptor, the sound collector are all connected with an input end of the first processor, and the first processor is connected with the wireless communication module. The unmanned aerial vehicle is responsible for collecting video and environment data of the scenic spots.

The experience site subsystem comprises a cuboid room and a wearable intelligent device. In the room six projectors are arranged in the middle for projecting onto front, rear, upper, lower, left and right wall surfaces, and a blower are provided at all four sides of the room respectively. The room is further equipped with a temperature controller, a humidity controller, an illumination controller, a loudspeaker, a wire communication module and a second processor. In addition, a walking caterpillar is arranged on a bottom surface of the room, and the walking caterpillar is arranged on a rotary base. The wearable intelligent device is provided with a gyroscope, the wire communication module is connected with the second processor. An output end of the second processor is connected with input ends of the six projectors, four blowers, temperature controller, humidity controller, illumination controller, loudspeaker and rotary base respectively for controlling the experience site subsystem to create a corresponding environment when the second processor receives environment data collected by the sight real-time acquisition subsystem. The output ends of both the gyroscope and the walking caterpillar are connected with the second processor for controlling the unmanned aerial vehicle in the sight real-time acquisition subsystem to steer and move as well as controlling the rotary base to rotate correspondingly when the gyroscope in the experience site subsystem experiences a change in direction and distance.

The center platform subsystem comprises a video streaming server for processing video data, a control streaming server for processing control data, an information streaming server for user processing information transmission, a database server for storing data and a center switch, wherein the center switch is connected with the video streaming server, the control streaming server, the information streaming server and the database server respectively.

As shown in the sole FIGURE, the network transmission subsystem comprises a front end switch, a first fiber optical transceiver, a second fiber optical transceiver and a core switch, wherein the front end switch is used for connecting the wireless communication module in the sight real-time acquisition subsystem or the wire communication module in the experience site subsystem, the front end switch is connected with the first fiber optical transceiver, the first fiber optical transceiver is connected with the second fiber optical transceiver, the second fiber optical transceiver is connected with the core switch, and the core switch is connected with the center switch. The network transmission subsystem mainly comprises a switch, an optical transmission device and the like, realizing data and image information transmission between a front-end acquisition subsystem and a center management subsystem. The real-time and reliability of data transmission are ensured via optical fiber transmission. The first fiber optical transceiver and the second fiber optical transceiver are connected via optical fiber.

Preferably, the sound collector is a microphone. The illumination controller may be an LED lamp arranged around the room.

Preferably, the wireless communication module is a 3G mobile communication module, a 4G mobile communication module or a WIFI wireless communication module.

Preferably, the wearable intelligent device is an intelligent helmet.

For instance, a user may wear the intelligent helmet, select scenic spots, and stand on the walking caterpillar. At this time, the control server in the center platform subsystem selects the sight real-time acquisition subsystem of a corresponding scenic spot to establish a real-time communication link. The unmanned aerial vehicle in the sight real-time acquisition subsystem starts and transmits shot images in the front, rear, upper, lower, left and right directions to the video streaming server to process, and then the images are projected by the projectors of the experience site subsystems onto the front, rear, upper, lower, left and right wall surfaces of the cuboid room. Meanwhile, such environment data as temperature, humidity, illumination, wind direction, wind power, sound or the like of the scenic spot are collected by various receptors, and then transmitted to the experience site subsystem after processed by the information streaming server, and the above-mentioned environment factors are simulated by various simulators in the experience site subsystem. When the user walks on the walking caterpillar, the walking caterpillar processes some parameters, such as a walking distance, a speed or the like and transferred to the sight real-time acquisition subsystem, the unmanned aerial vehicle is accordingly controlled to move at a same speed and distance and to return video and environment data in real time. When the gyroscope on the intelligent helmet generates steering information of the user, steering angle information is transmitted to the second processor, and the second processor controls the rotary base to rotate at a corresponding angle in an opposite direction, and transmits the steering angle information to the sight real-time acquisition subsystem via the information steaming server, controls the unmanned aerial vehicle to steer, and returns the video and environment data in real time.

The present invention is based on virtual reality technology, collects scenery and environment parameters of scenic spots using an unmanned aerial vehicle, transmits to an experience site, and simulates a sight real-time state via the experience site, so that the user experience is more real; in the meanwhile, the user can view in motion via a walking caterpillar and a rotary base, a scenery environment can also be moved or steered due to the motion or steering of the user, so that the user experience is significantly enhanced.

The invention can be widely applied in various virtual travel systems.

The above is the specific descriptions for the preferred embodiment of the present invention, but not intended to limit scope of the invention. Various identical transformations or replacements can be further made by those skilled in the art without departing from the spirit of the invention and shall all fall within the scope limited by the claims.

What is claimed is:

1. A real-time travel experience system based on virtual reality technology, comprising:
a plurality of sight real-time acquisition subsystems;
a network transmission subsystem, connected with the plurality of sight real-time acquisition subsystems;
a central platform subsystem, connected with the network transmission subsystem; and
a plurality of experience site subsystems, connected with the network transmission subsystem;

wherein:
the sight real-time acquisition subsystem comprises at least one unmanned aerial vehicle comprising a video camera in front, rear, upper, lower, left and right directions thereof respectively, and a temperature receptor, a humidity receptor, an illumination receptor, a wind direction receptor, a wind power receptor, a sound collector, a wireless communication module and a first processor, wherein output ends of the temperature receptor, the humidity receptor, the illumination receptor, the wind direction receptor, the wind power receptor, and the sound collector are connected with an input end of the first processor, and the first processor is connected with the wireless communication module;
the experience, site subsystem comprises a cuboid room and a wearable intelligent device, wherein the room is provided with six projectors arranged in the middle thereof for projecting onto front, rear, upper, lower, left and right wall surfaces of the room respectively, a blower arranged on four of the wall surfaces of the room respectively, a temperature controller, a humidity controller, an illumination controller, a loudspeaker, a wire communication module and a second processor, and a walking caterpillar, wherein the walking caterpillar is arranged on a rotary base on a bottom surface of the room, the wearable intelligent device is provided with a gyroscope, the wire communication module is connected with the second processor, an output end of the second processor is connected with input ends of the six projectors, four blowers, temperature controller, humidity controller, illumination controller, loudspeaker and rotary base respectively for controlling the experience site subsystem to create a corresponding environment when the second processor receives environment data collected by the sight real-time acquisition subsystem, output ends of both the gyroscope and the walking caterpillar are connected with the second processor for controlling the unmanned aerial vehicle in the sight real-time acquisition subsystem to steer and move as well as controlling the rotary base to rotate correspondingly when the gyroscope in the experience site subsystem senses a change in direction and distance;
the central platform subsystem comprises a video streaming server for processing video data, a control streaming server for processing control data, an information streaming server for user processing information transmission, a database server for storing data and a center switch, wherein the center switch is connected with the video streaming server, the control streaming server, the information streaming server and the database server respectively; and
the network transmission subsystem comprises a front end switch, a first fiber optical transceiver, a second fiber optical transceiver and a core switch, wherein the front end switch is used for connecting the wireless communication module in the sight real-time acquisition subsystem or the wire communication module in the experience site subsystem, the front end switch is connected with the first fiber optical transceiver, the first fiber optical transceiver is connected with the second fiber optical transceiver, the second fiber optical transceiver is connected with the core switch, and the core switch is connected with the center switch.

2. The real-time travel experience system based on the virtual reality technology according to claim 1, wherein the sound collector is a microphone.

3. The real-time travel experience system based on the virtual reality technology according to claim 1, wherein the wireless communication module is a 3G mobile communication module, 4G mobile communication module or a WIFI wireless communication module.

4. The real-time travel experience system based on the virtual reality technology according to claim 1, wherein the wearable intelligent device is an intelligent helmet.

5. The real-time travel experience system based on the virtual reality technology according to claim 2, wherein the wearable intelligent device is an intelligent helmet.

6. The real-time travel experience system based on the virtual reality technology according to claim 3, wherein the wearable intelligent device is an intelligent helmet.

* * * * *